United States Patent
Fisher

[15] 3,695,628
[45] Oct. 3, 1972

[54] FARM WAGON STEERING STABILIZER

[72] Inventor: James C. Fisher, R.F.D. 1, Shelbina, Mo. 63468

[22] Filed: July 1, 1970

[21] Appl. No.: 51,603

[52] U.S. Cl. ...................................280/103, 280/94
[51] Int. Cl. ..............................................B62d 13/04
[58] Field of Search........280/103, 89, 94, 95, 98, 99, 280/480, 408, 443, 445, 488

[56] References Cited

UNITED STATES PATENTS

| | | | |
|---|---|---|---|
| 2,566,565 | 9/1951 | Hill | 280/103 |
| 2,203,583 | 6/1940 | Stoxen | 280/103 |
| 1,265,982 | 5/1918 | Wilson | 280/94 |
| 1,599,353 | 9/1926 | Albin | 280/480 X |
| 1,564,662 | 12/1925 | Flemister | 280/89 X |
| 2,559,142 | 7/1951 | Woodworth | 280/103 |

Primary Examiner—Kenneth H. Betts
Attorney—Clarence A. O'Brien and Harvey B. Jacobson

[57] ABSTRACT

An elongated tension member having at least one elastic section. One end of the tension member is anchored to the center coupling pole of a four-wheel farm wagon and the other end of the tension member is connected to the outer end of the steering arm carried by one of the spindle assemblies of the front wheels of the wagon in order to apply a pull on the one steering arm to a first side of the wagon while applying a pull in the opposite direction on the rear end of the coupling pole. Further, a pull in the first direction is also applied to the forward end portion of the associated wagon tongue to which the tie rod for the front wheels of the wagon is secured and thus a thrust in the first direction is applied to the rear end of the towing vehicle to which the forward end of the wagon tongue is secured.

7 Claims, 4 Drawing Figures

PATENTED OCT 3 1972  3,695,628
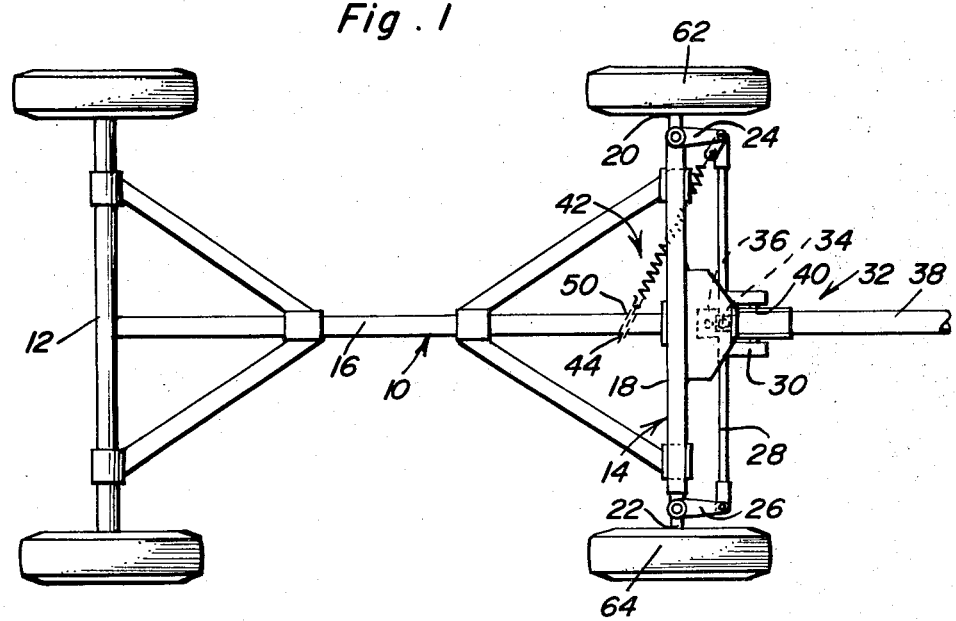
Fig. 1
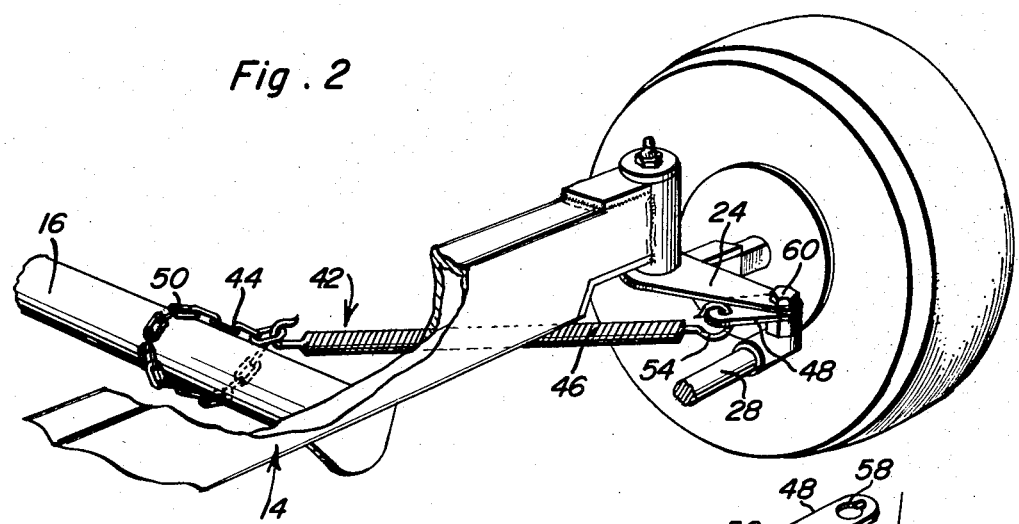
Fig. 2
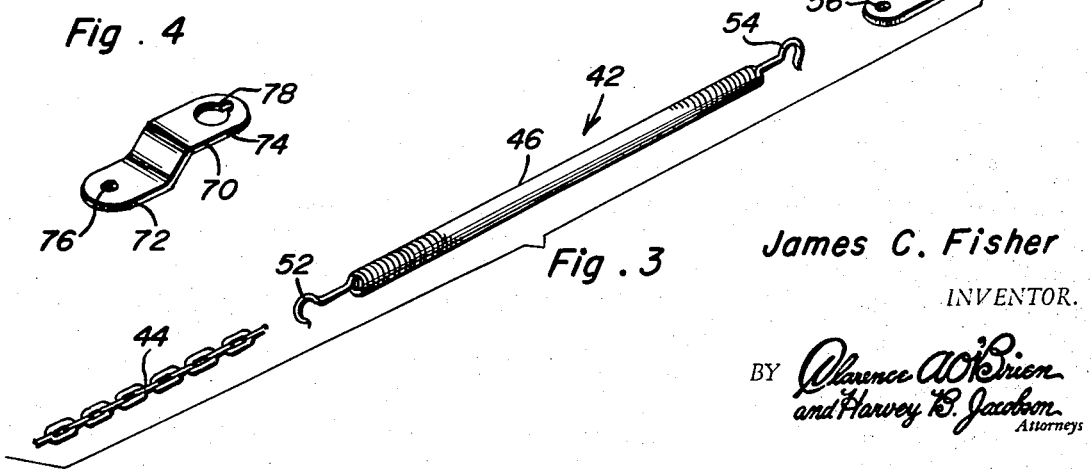
Fig. 4
Fig. 3
James C. Fisher
INVENTOR.
BY Clarence A. O'Brien
and Harvey B. Jacobson
Attorneys

FARM WAGON STEERING STABILIZER

The stabilizer of the instant invention has been designed to provide a means whereby the tendency of a four-wheel farm wagon to whip from side to side while traveling over a road at relatively high speeds is substantially reduced or entirely eliminated.

The stabilizer is effective to apply a pull on the front wheels of the associated farm wagon to steer the wheels to one side of the vehicle while at the same time exerting a pull on the coupling pole of the wagon to swing the rear end of the coupling pole to the other side of the wagon. Also, by applying a pull on the front wheels of the wagon to steer the latter to the first side a thrust is applied to the same side of the wagon on the front end of the wagon tongue and thus to the towing vehicle to which the wagon tongue is secured.

The main object of this invention is to provide a steering stabilizer for a four-wheel farm trailer and operable to apply a straight force upon the steering mechanism of the farm wagon to turn the front wheels in one direction whereby this slight force to turn the wheels must be counteracted by the steering effect of the towing vehicle on the tongue of the wagon and thus any tendency of the wagon to whip from side to side while being trailed at high speeds is substantially eliminated.

Another object of this invention is to provide a steering stabilizer constructed in a manner whereby it may be readily attached to substantially all types of four-wheel farm wagons.

Yet another object of this invention is to provide a steering stabilizer including structural components enabling it to be operatively associated with a four-wheel farm wagon without the use of tools of a special nature.

A still further object of this invention is to provide a steering stabilizer that may be utilized in conjunction with four-wheel farm wagons of various manufacture.

A final object of this invention to be specifically enumerated herein is to provide a steering stabilizer in accordance with the preceding objects which will conform to conventional forms of manufacture, be of simple construction and easy to install so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top plan view of the running gear of a conventional form of four-wheel farm wagon utilizing a coupling pole between the front and rear axle assemblies of the wagon and with the steering stabilizer of the instant invention operatively associated with the steering arm of the left front spindle of the wagon and the forward end of the coupling pole;

FIG. 2 is a fragmentary enlarged perspective view of the left corner portion of the farm wagon illustrating the manner in which the steering stabilizer is operatively associated therewith;

FIG. 3 is an exploded perspective view of the steering stabilizer; and

FIG. 4 is a perspective view of a modified form of anchor to be utilized in conjunction with one end of the elastic section of the tension member which comprises the stabilizer.

Referring now more specifically to the drawings, the numeral 10 generally designates the running gear of a conventional four-wheel farm wagon. The running gear 10 includes a rear axle assembly 12 and a front axle assembly generally referred to by the reference numeral 14. A coupling pole 16 extends between the rear and front axle assemblies 12 and 14.

The front axle assembly includes a main axle beam 18 and a pair of opposite end spindle assemblies 20 and 22 which are each oscillatably supported from the corresponding end of the axle beam 18 for swinging about a vertical axis. The spindle assemblies 20 and 22 include forwardly extending steering arms 24 and 26 whose forward ends are interconnected by means of a tie rod 28 and the center portion of the tie rod 28 is coupled to the rear mounting portion 30 of a towing tongue assembly referred to in general by the reference numeral 32 as at 34. The mounting assembly 30 is oscillatably supported from the central portion of the axle beam 18 for swinging movement about an upstanding axis as at 36 and the towing tongue 32 includes a forwardly projecting tow bar or pole 38 whose rear end is pivotally supported from the mounting assembly 30 for swinging about a horizontal transverse axis as at 40. Of course, the forward end of the tow pole 38 is adapted to be universally secured to any suitable towing vehicle.

The foregoing comprises a description of a conventional form of wagon running gear.

The steering stabilizer assembly of the instant invention is generally referred to by the reference numeral 42 and includes a section of link chain 44, an elongated tension or expansion spring 46 and an anchor plate 48. The link chain section 44 is encircled about the forward end of the coupling pole 16 as at 50 and one end of the expansion spring 46 is provided with a hook 52 which is engaged with the link chain section 44. The other end of the expansion spring 46 is provided with a hook 54 and the hook 54 is engaged with an aperture 56 formed in one end of the anchor plate 48.

The end of the anchor plate 48 remote from the aperture 56 includes a keyhole opening 58 and the conventional fastener 60 utilized to secure the forward terminal end of the steering arm 24 to the left hand end of the tie rod 28 is passed through the keyhole opening 58.

When the steering stabilizer assembly is thus applied to the wagon running gear 10, the expansion spring 46 exerts a pull to the right on the forward end of the left steering arm 24 so as to urge the wheels 62 and 64 journaled from the spindle assemblies 20 and 22 to the right. Additionally, the tension of the expansion spring 46 exerts a pull on the coupling pole 16 rearward of the vertical pivot axis 36 and therefore tends to swing the rear end of the coupling pole 16 and thus the rear end of the running gear 10 to the left.

The pull to the right on the forward end of the left steering arm 24 is transmitted to the mounting assembly 30 for the towing tongue assembly 32 through the tie rod 28 and thus the forward end of the tow pole 38 has a tendency to swing to the right. When the forward end of the tow pole 38 is coupled to the rear end of a towing vehicle, the thrust to the right applied to the tow pole 38 forward of the pivot axis 36 is also transmitted to the towing vehicle. However, the towing vehicle has of course sufficient weight supported from its rear end to provide the necessary traction to resist sideways movement of its rear ground-engaging wheels as the thrust to the right on the forward end of the tow pole 38 is comparatively slight. However, the towing vehicle, in resisting or overcoming this tendency to being shifted to the right takes up substantially any slack in the various coupling joints of the steering assembly of the running gear 10 and thus there is substantially no tendency for the running gear 10 to sway from side to side as it is towed at high speeds.

Although the running gear 10 has been illustrated and described herein as having the tie rod 28 disposed forward of the axle beam 18, the steering stabilizer assembly 42 is equally effective on farm wagon running gear provided with a tie rod disposed rearward of the front axle beam. Further, the end of the expansion spring 46 remote from the link chain section 44 may be readily engaged with either steering arm.

With attention now invited more specifically to FIG. 4 of the drawings, there may be seen a modified form of anchor plate referred to by the reference numeral 70 and which is similar to the anchor plate 48. However, the anchor plate 70 includes relatively laterally offset opposite end portions 72 and 74 and it may be seen that the end portion or section 72 is provided with an aperture 76 corresponding to the aperture 56. Further, the end portion or section 74 is provided with a keyhole opening or slot 78 corresponding to the opening 58. Of course, the anchor plate 70 is designed to be utilized on wagon running gear including front axle steering connections which might cause interference between the anchor plate 48 and the adjacent relatively movable components of the steering assembly. In such instances, the anchor plate 70, with its relatively offset end portions, has been found to be fully operative without any interference with the relatively movable components of the farm wagon steering gear.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a four-wheel trailer chassis provided with dirigible front wheel spindles and a steering assembly including steering arm portions carried by said spindles and transverse tie rod means secured and extending between said arm portions with a forwardly projecting towing tongue including a rear end portion pivotally secured to the trailer chassis for oscillation about an upstanding axis and means connecting said tongue to said tie rod means for reciprocation of the latter in response to oscillation of the towing tongue, an anti-sway attachment including an elongated tension member provided with at least one tensioned elastic section, first means anchoring one end of said tension member to said chassis at a point adjacent the centerline thereof and second means anchoring the other end of said tension member to a portion of said steering assembly adjacent one of said spindles whereby said tension member will exert a constant force on said steering assembly to turn said spindles in one direction, said trailer chassis including a longitudinal center coupling pole extending between the opposite end portions of the wagon chassis, said first means comprising a link chain section encircled about the forward end portion of said coupling pole and having said one end of said tension member anchored to said link chain section.

2. The combination of claim 1 wherein said second means comprises an elongated anchor plate having one end secured to one of said steering arm portions at the point of connection of the corresponding end of the tie rod means therewith and the other end of said anchor plate has said other end of said tension member anchored thereto.

3. The combination of claim 2 wherein said anchor plate includes a keyhole opening on one end thereof, said steering assembly including an upstanding fastener secured through one of said steering arm portions and the corresponding end of said tie rod means, said fastener passing through said keyhole opening.

4. The combination of claim 3 wherein said anchor plate is substantially planar.

5. The combination of claim 3 wherein the opposite end portions of said anchor plate are relatively offset and joined by an inclined center portion of said anchor plate.

6. In combination with a vehicle chassis provided with dirigible front wheel spindles and a steering assembly including steering arm portions carried by said spindles and transverse tie rod means secured and extending between said arm portions with a forwardly projecting towing tongue including a rear end portion pivotally secured to the trailer chassis for oscillation about an upstanding axis and means connecting said tongue to said tie rod means for reciprocation of the latter in response to oscillation of the towing tongue, anti-sway means including an elongated tension member provided with at least one tensioned elastic section, first means anchoring one end of said tension member to said chassis at a point adjacent the centerline thereof and the second means anchoring the other end of said tension member to a portion of said steering assembly adjacent one of said spindles whereby said tension member will exert a constant force on said steering assembly to turn said spindles in one direction, said vehicle chassis including a longitudinal member, said first means comprising a flexible member encircled about said longitudinal chassis member adjacent the forward end thereof and having said one end of said tension member anchored thereto.

7. The combination of claim 6 wherein said second means comprises an elongated anchor plate having one end secured to one of said steering arm portions at the point of connection of the corresponding end of the tie rod means therewith and the other end of said anchor plate has said other end of said tension member anchored thereto.

* * * * *